(12) United States Patent
Tojo

(10) Patent No.: US 7,719,699 B2
(45) Date of Patent: May 18, 2010

(54) IMAGE STORAGE APPARATUS, EXTERNAL IMAGE PROCESSING APPARATUS, CONTROL METHOD FOR IMAGE STORAGE APPARATUS AND CONTROL METHOD FOR EXTERNAL IMAGE PROCESSING APPARATUS

(75) Inventor: Akihiko Tojo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1188 days.

(21) Appl. No.: 10/620,897

(22) Filed: Jul. 15, 2003

(65) Prior Publication Data
US 2004/0012805 A1 Jan. 22, 2004

(30) Foreign Application Priority Data
Jul. 16, 2002 (JP) ............................. 2002-207363

(51) Int. Cl.
*H04N 5/225* (2006.01)
*G06F 3/012* (2006.01)
*G06K 15/00* (2006.01)

(52) U.S. Cl. .............. 358/1.13; 348/207.99; 348/207.2; 358/1.16; 358/1.15; 358/1.1; 347/2

(58) Field of Classification Search .................. 358/1.6, 358/1.9, 1.13–1.16; 348/207.2, 207.99, 221.1, 348/231.99; 710/100, 107, 2, 29, 14; 714/746; 713/201, 323; 399/81; 382/305, 274
See application file for complete search history.

(56) References Cited
U.S. PATENT DOCUMENTS
5,970,181 A * 10/1999 Ohtsu .......................... 382/274
6,018,816 A * 1/2000 Tateyama ................... 714/746

(Continued)

FOREIGN PATENT DOCUMENTS
JP 2000-118086 4/2000

(Continued)

OTHER PUBLICATIONS

DPS Promotors—Canon, et al. "White Paper of DPS Specification" Dec. 2, 2002. XP002259117.

(Continued)

*Primary Examiner*—Twyler L Haskins
*Assistant Examiner*—Chad Dickerson
(74) *Attorney, Agent, or Firm*—Cowan, Liebowitz & Latman, P.C.

(57) ABSTRACT

When different types of image storage apparatus such as an image sensing apparatus and an external image processing apparatus such as a printer are connected, in order to eliminate an operation error by an operator, cumbersome operation, and so forth by enabling to automatically perform optimum direct signal processing, whether control relation between the image storage apparatus and the external image processing apparatus is a first type in which a memory in the image storage apparatus is accessed directly from the external image processing apparatus, or a second type in which processing in the external image processing apparatus can be controlled by a controller of the image storage apparatus is determined in initial communication when the image storage apparatus is connected to the external image processing apparatus, and a processing procedure for processing an image in the image storage apparatus by the external image processing apparatus is changed based on the result of the determination.

15 Claims, 4 Drawing Sheets

U.S. PATENT DOCUMENTS

| | | | | |
|---|---|---|---|---|
| 6,115,137 | A * | 9/2000 | Ozawa et al. | 358/1.6 |
| 6,273,535 | B1 * | 8/2001 | Inoue et al. | 347/3 |
| 6,298,405 | B1 * | 10/2001 | Ito et al. | 710/107 |
| 6,334,161 | B1 * | 12/2001 | Suzuki et al. | 710/29 |
| 6,357,021 | B1 * | 3/2002 | Kitagawa et al. | 714/41 |
| 6,504,960 | B2 * | 1/2003 | Takahashi | 382/305 |
| 6,529,522 | B1 * | 3/2003 | Ito et al. | 370/466 |
| 6,535,985 | B1 * | 3/2003 | Oshima et al. | 713/323 |
| 6,549,958 | B1 * | 4/2003 | Kuba | 710/14 |
| 6,552,743 | B1 * | 4/2003 | Rissman | 348/207.2 |
| 6,603,506 | B2 * | 8/2003 | Ogawa et al. | 348/207.2 |
| 6,618,553 | B1 * | 9/2003 | Shiohara | 386/117 |
| 6,774,935 | B1 * | 8/2004 | Morimoto et al. | 348/211.5 |
| 6,867,882 | B1 * | 3/2005 | Takahashi | 358/1.6 |
| 6,912,060 | B1 * | 6/2005 | Luciano et al. | 358/1.15 |
| 6,948,792 | B2 * | 9/2005 | Narusawa et al. | 347/19 |
| 6,956,671 | B2 * | 10/2005 | Monty et al. | 358/1.9 |
| 7,031,005 | B1 * | 4/2006 | Nakanishi | 358/1.15 |
| 7,042,496 | B2 * | 5/2006 | Sato | 348/207.2 |
| 7,075,573 | B2 * | 7/2006 | Imaeda | 348/231.99 |
| 7,200,685 | B2 * | 4/2007 | Uemura | 710/2 |
| 7,262,873 | B1 * | 8/2007 | Rasche et al. | 358/1.15 |
| 2001/0013949 | A1 | 8/2001 | Tateyama | |
| 2002/0054344 | A1 * | 5/2002 | Tateyama | 358/1.15 |
| 2002/0063872 | A1 | 5/2002 | Ouchi | |
| 2002/0105678 | A1 * | 8/2002 | Shiraiwa | 358/1.15 |
| 2002/0141776 | A1 * | 10/2002 | Hirakawa et al. | 399/81 |
| 2003/0001957 | A1 * | 1/2003 | Kubota | 348/207.2 |
| 2003/0007169 | A1 * | 1/2003 | Tanaka et al. | 358/1.15 |
| 2003/0016378 | A1 * | 1/2003 | Ozawa et al. | 358/1.13 |
| 2003/0071903 | A1 * | 4/2003 | Nakami | 348/221.1 |
| 2003/0208691 | A1 * | 11/2003 | Smart et al. | 713/201 |

FOREIGN PATENT DOCUMENTS

WO 97/50243 12/1997

OTHER PUBLICATIONS

European Search Report Oct. 24, 2003.

* cited by examiner

IMAGE STORAGE APPARATUS, EXTERNAL IMAGE PROCESSING APPARATUS, CONTROL METHOD FOR IMAGE STORAGE APPARATUS AND CONTROL METHOD FOR EXTERNAL IMAGE PROCESSING APPARATUS

FIELD OF THE INVENTION

The present invention relates to an image storage apparatus, an external image processing apparatus, a control method for the image storage apparatus and a control method for the external image processing apparatus.

BACKGROUND OF THE INVENTION

Conventionally, for printing an image sensed by a digital image sensing apparatus such as a digital camera, image data is downloaded to a computer such as a personal computer on a temporary basis, and is then outputted to a printer connected to the computer using an application for printing the image.

In the above technique, the user retrieves list information and file names of images based on information displayed on a display using an application on the computer, and selects output data to print the data. Recently, on the other hand, a color print system allowing digital image data to be transferred from a digital camera directly to a color printer without using a PC and printed by the color printer, so called a photo direct (PD) printer in which a memory card installed in a digital camera and storing picked-up images is inserted directly in a color printer so that the picked-up images stored in the memory can be printed, and the like have been developed.

Since the specifications and the operation method of the digital camera are different for each manufacturer, desired is a photo direct printer apparatus capable of accommodating digital cameras of various kinds of manufacturers upon transferring image data from the digital camera directly to the printer to print the data. For the printer apparatus allowing a digital camera of each manufacturer to be connected directly thereto to print data, it is required that print information optionally set in each camera should be matched to the print conditions in the printer apparatus.

SUMMARY OF THE INVENTION

The present invention has been made in consideration of the above situation, and has as its object to provide an image storage apparatus such as an image sensing apparatus or external image processing apparatus capable of storing an image making use of the portability and easily carrying out processing such as the printing of a sensed image by the external image processing apparatus.

Another object of the invention is to provide an image storage apparatus such as an image sensing apparatus or external image processing apparatus or control methods for the apparatuses making it possible to automatically recognize the external image processing apparatus at the time when the image sensing apparatus is connected to the external image processing apparatus in a wired or wireless manner to transfer an image signal and to control processing such as printing in an optimum mode by the external image processing apparatus.

According to the present invention, the foregoing object is attained by providing an image sensing apparatus comprising an image sensing unit which converts an optical image of an object into an electric image signal, an interface capable of communicating with an external processing apparatus, and a control unit which transfers the image signal to the external processing apparatus to process the same, wherein the control unit comprises: a determination unit which determines whether control relation between the image sensing apparatus and the external processing apparatus is a first type in which a memory in the image sensing apparatus can be accessed directly from the external processing apparatus, or a second type in which processing in the external processing apparatus can be controlled by a controller of the image sensing apparatus, by communication with the external processing apparatus via the interface; and a processing controller which changes a processing procedure for processing an image in the image sensing apparatus by the external processing apparatus based on the result of the determination.

Further, the foregoing object is also attained by providing a control method for an image sensing apparatus comprising an image sensing unit which converts an optical image of an object into an electric image signal, an interface capable of communicating with an external processing apparatus, and a control unit which transfers the image signal to the external processing apparatus to process the same, the control method comprising: determining whether control relation between the image sensing apparatus and the external processing apparatus is a first type in which a memory in the image sensing apparatus can be accessed directly from the external processing apparatus, or a second type in which processing in the external processing apparatus can be controlled by a controller of the image sensing apparatus, by communication with the external processing apparatus via the interface; and changing a processing procedure for processing an image in the image sensing apparatus by the external processing apparatus based on the result of the determination.

According to the present invention, the foregoing object is also attained by providing an processing apparatus communicating with an image sensing apparatus which converts an optical image of an object into an electric image signal and comprises an interface capable of communicating with the processing apparatus, comprising: a determination unit which determines whether control relation between the image sensing apparatus and the processing apparatus is a first type in which a memory in the image sensing apparatus can be accessed directly from the processing apparatus, or a second type in which processing in the processing apparatus can be controlled by the image sensing apparatus, by communication with the image sensing apparatus via the interface; and a processing controller which changes a processing procedure for processing an image in the image sensing apparatus by the processing apparatus based on the result of the determination.

Further, the foregoing object is also attained by providing a control method for an processing apparatus communicating with an image sensing apparatus which converts an optical image of an object into an electric image signal and comprises an interface capable of communicating with the processing apparatus, comprising: determining whether control relation between the image sensing apparatus and the processing apparatus is a first type in which a memory in the image sensing apparatus can be accessed directly from the processing apparatus, or a second type in which processing in the processing apparatus can be controlled by the image sensing apparatus, by communication with the image sensing apparatus via the interface; and changing a processing procedure for processing the image in the image sensing apparatus by the processing apparatus based on the result of the determination.

Furthermore, according to the present invention, the foregoing object is also attained by providing an image storage apparatus comprising a storage unit which stores an electric image signal, an interface capable of communicating with an external image processing apparatus, and a control unit which transfers the image signal to the external image processing apparatus to process the same, wherein the control unit comprises: a determination unit which determines whether control relation between the image sensing apparatus and the external image processing apparatus is a first type in which the storage unit in the image storage apparatus can be accessed directly from the external image processing apparatus, or a second type in which processing in the external image processing apparatus can be controlled by a controller of the image storage apparatus, by communication with the external image processing apparatus via the interface; and a processing controller which changes a processing procedure for processing an image in the image storage apparatus by the external image processing apparatus based on the result of the determination.

Further, according to the present invention, the foregoing object is also attained by providing an image processing apparatus communicating with an image storage apparatus which stores an electric image signal and comprises an interface capable of communicating with the image processing apparatus, comprising: a determination unit which determines whether control relation between the image storage apparatus and the image processing apparatus is a first type in which a memory in the image storage apparatus can be accessed directly from the image processing apparatus, or a second type in which processing in the image processing apparatus can be controlled by the image storage apparatus, by communication with the image storage apparatus via the interface; and a processing controller which changes a processing procedure for processing an image in the image storage apparatus by the image processing apparatus based on the result of the determination.

Further, the foregoing object is also attained by providing a control method for an image storage apparatus comprising a storage unit which stores an electric image signal, an interface capable of communicating with an external image processing apparatus, and a control unit which transfers the image signal to the external image processing apparatus to process the same, the method comprising: determining whether control relation between the image storage apparatus and the external image processing apparatus is a first type in which a memory in the image storage apparatus can be accessed directly from the external image processing apparatus, or a second type in which processing in the external image processing apparatus can be controlled by a controller of the image storage apparatus, by communication with the external image processing apparatus via the interface; and changing a processing procedure for processing an image in the image storage apparatus by the external image processing apparatus based on the result of the determination.

Further, the foregoing object is also attained by providing a control method for an image processing apparatus communicating with an image storage apparatus which stores an electric image signal and comprises an interface capable of communicating with the image processing apparatus, the method comprising: determining whether control relation between the image storage apparatus and the image processing apparatus is a first type in which a memory in the image storage apparatus can be accessed directly from the image processing apparatus, or a second type in which processing in the image processing apparatus can be controlled by the image storage apparatus, by communication with the image storage apparatus via the interface; and changing a processing procedure for processing the image in the image storage apparatus by the image processing apparatus based on the result of the determination.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

Preferred embodiment of the present invention will be described in detail in accordance with the accompanying drawings.

Figure 1:
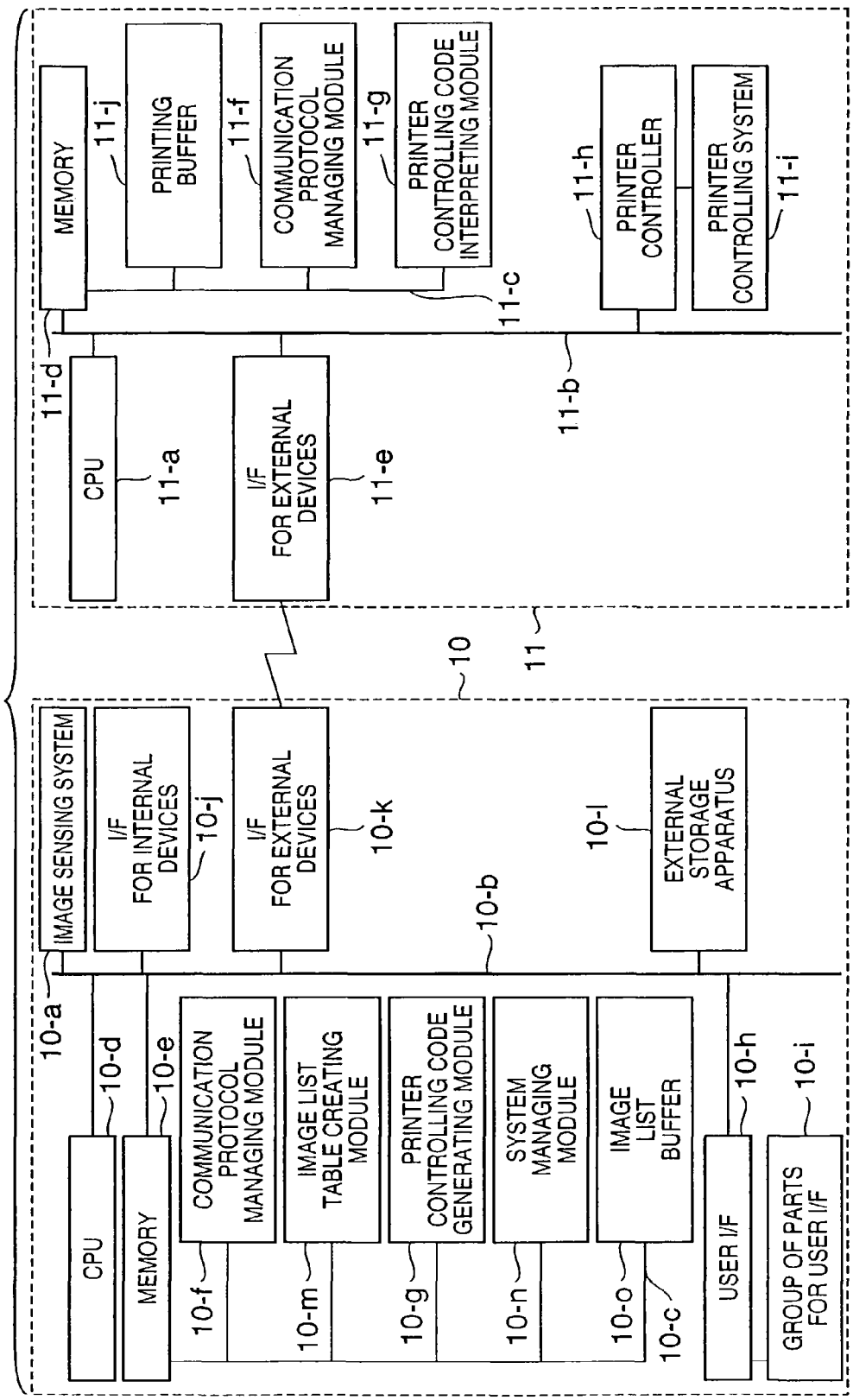
FIG. 1 is a block diagram showing an example of a system configuration constituted by an image sensing apparatus and an external image processing apparatus according to an embodiment of the present invention.

FIG. 1 is a block diagram showing a system configuration according to the embodiment of the present invention.

In the example of the image sensing and printing system of this embodiment shown in FIG. 1, an image sensing apparatus (e.g. digital camera) main body 10 as an image storage apparatus of this embodiment comprises an image sensing system 10-$a$, a CPU-10$d$, a memory 10-$e$, a group of parts for user interface 10-$i$ and an interface 10-$h$, an interface for internal devices 10-$j$, an interface for external devices 10-$k$ and an external storage apparatus 10-$l$, and the foregoing modules are connected to one another by a system bus 10-$b$ and a local bus 10-$c$.

The group of parts for user interface 10-$i$ includes a display unit (liquid crystal display unit) for displaying picked-up images, simple messages and the like, and a various kinds of buttons such as a shutter button to be pressed when capturing an image, a print button to be used when printing an image, and a button for selecting a menu item displayed on the display unit.

The image sensing apparatus main body 10 can communicate with a printing apparatus 11 via the interface for external devices 10-$k$.

Further, assigned to the memory 10-$e$ are a module 10-$f$ for managing communication protocols between the image sensing apparatus main body 10 and the printing apparatus 11 as external image processing apparatus (including, for example, an external display apparatus, a printing apparatus, an external recording apparatus and an external computer), a module 10-$m$ for creating an image list table of image data stored in the external storage apparatus 10-$l$ as a detachable (e.g., card-type or disc-type) image memory, a module 10-$g$ for generating printer controlling codes, a system managing module 10-*n* for managing the entire image sensing system 10, and an image list buffer 10-*o*.

In the above configuration, the shutter button provided in the group of parts for UI 10-*i* is pressed, whereby image data picked up in the image sensing system 10-*a* is stored as a file in the external storage apparatus 10-*l* as digital image data.

In this embodiment, when image data is stored in the external storage apparatus 10-*l*, the image data obtained by image sensing is compressed in the JPEG format and stored.

On the other hand, the printing apparatus 11 comprises a CPU 11-*a*, a memory 11-*d*, a printer controlling system 11-*i* and a controller 11-*h* and an interface for external devices 11-*e*, and the foregoing modules are connected to one another by a system bus 11-*b* and a local bus 11-*c*. To the memory 11-*d*, a module 11-*f* for managing communication protocols between the printing apparatus 11 and the image sensing apparatus 10, a printing buffer 11-*j* for storing printer controlling codes transferred from the image sensing apparatus, and a module 11-*g* for interpreting the codes are assigned.

In this embodiment, the system managing module 10-*n* in the memory 10-*e* always manages messages from the image sensing system 10-*a*, the interface for internal devices 10-*j*, the interface for external devices 10-*k* and the user interface 10-*h*. The communication protocol managing module 10-*f* manages signals inputting/outputting to/from the interface for external devices 10-*k*, namely communication with the printing apparatus 11.

A communication system for connecting between the image sensing apparatus main body 10 and the external image processing apparatus 11 may have either a wired or wireless form. As for the image storage apparatus, any apparatus which incorporates a storage unit for storing an image may be used, and the present invention is not limited to the image sensing apparatus.

The configurations of main parts concerned with control of the printing apparatus according to the embodiment will now be described with reference to FIG. 3.

Figure 3:
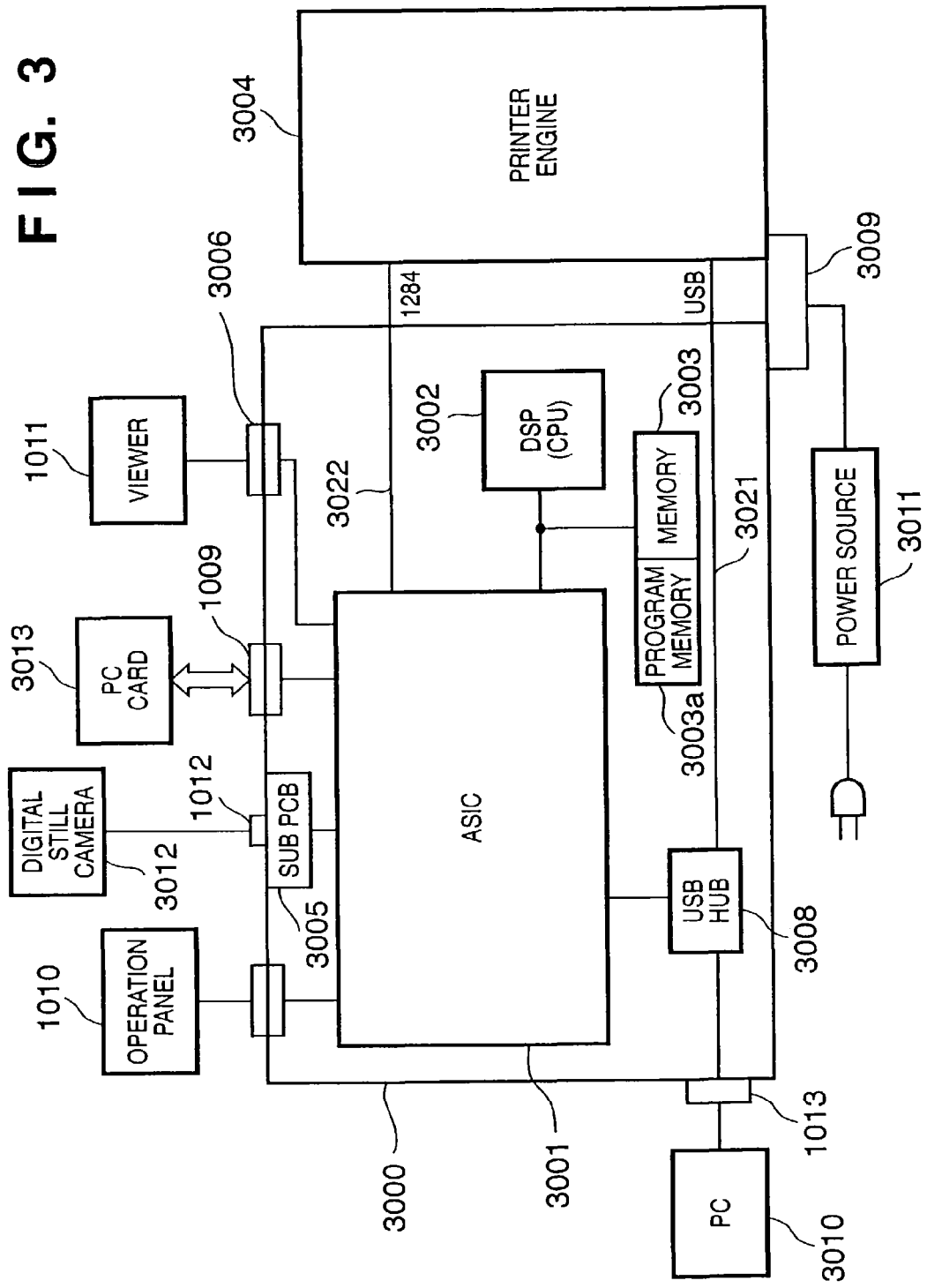
FIG. 3 shows a configuration of the printing apparatus according to the embodiment of the present invention.
Figure 4:
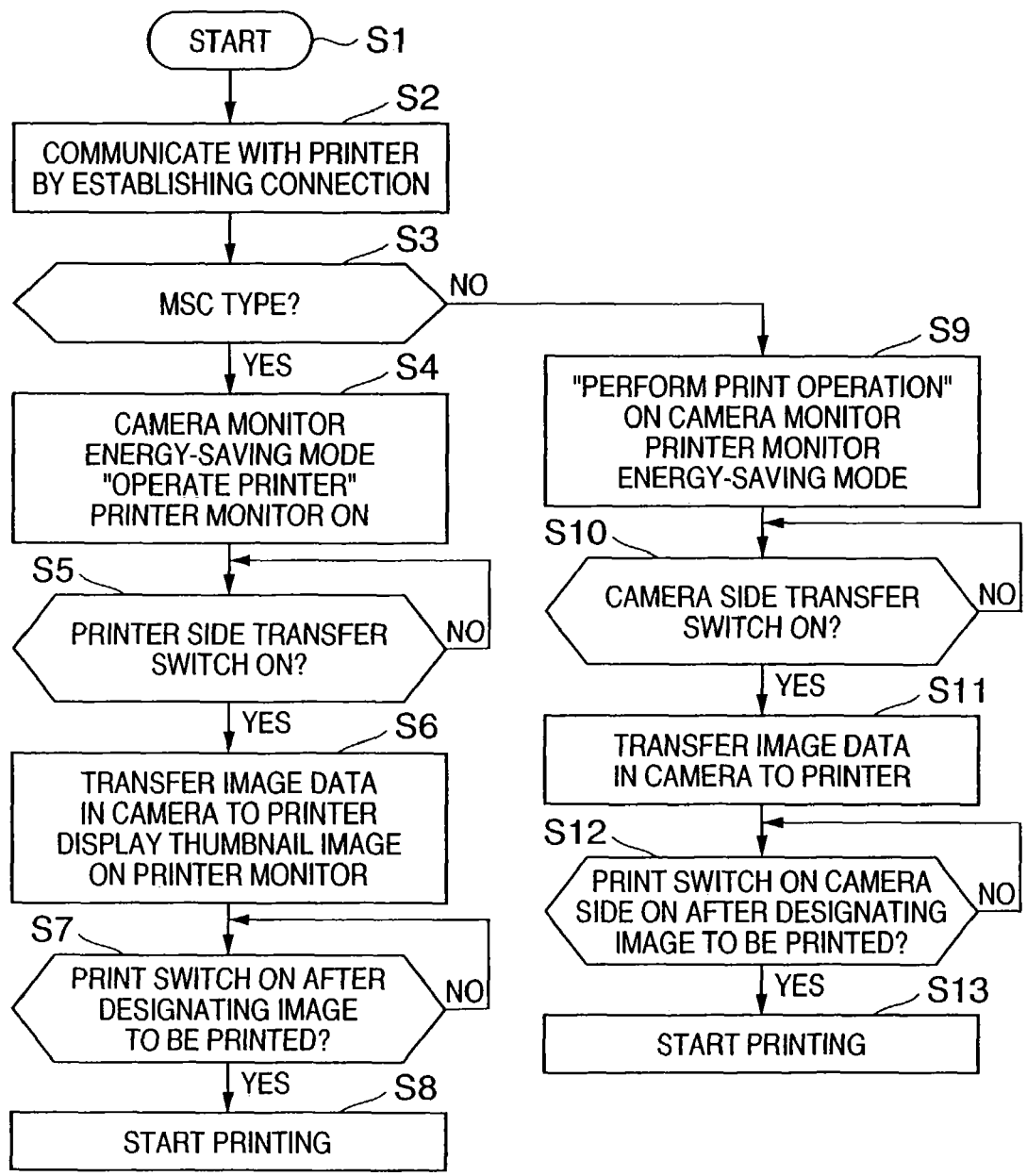
FIG. 4 is a flowchart showing a protocol between the image sensing apparatus and the printing apparatus and a flow of processing in the both apparatuses according to the embodiment of the present invention.

In FIG. 3, reference numeral 3000 denotes a control unit (control board). Reference numeral 3001 denotes an ASIC (dedicated custom LSI), reference numeral 3002 denotes a DSP (digital signal processor), which has a CPU therein and takes the task of various kinds of control processing and image processing such as conversion of a luminance signal (RGB) to a density signal (CMYK), scaling, gamma conversion, error diffusion and the like. Reference numeral 3003 denotes a memory, which has a program memory 3003*a* storing a control program of the CPU of the DSP 3002, a RAM area storing a runtime program, and a memory area storing image data and the like. Reference numeral 3004 denotes a printer engine, and in this case, a printer engine for an inkjet printer printing color images using color inks of a plurality of colors is installed. Reference numeral 3005 denotes a USB connector as a port for connecting with the digital still camera 3012. Reference numeral 3006 denotes a connector for connecting a viewer 1011. Reference numeral 3008 is a USB hub, and when the printing apparatus performs printing based on image data from a PC (external computer) 3010, data from the PC 3010 is directly passed and outputted to a printer engine 3004 via a USB 3021. In this way, the connected PC 3010 can exchange data and signals directly with the printer engine 3004 to perform printing (functions as a general PC printer).

Reference numeral 1009 denotes a card slot, into which an adapter capable of installing a memory card is inserted, and image data stored in the memory card can be directly read via this adopter and printed. The memory card (PC) is, for example, Compact Flash (registered trademark) Memory, Smart Media (registered trademark), Memory Stick (registered trademark) or the like. Reference numeral 1011 denotes a viewer (liquid crystal display unit), which is detachable from the printing apparatus main body, and is used for displaying an image and/or an index image of each frame when searching an image to be printed out of images stored in the PC card, and so on. Reference numeral 1012 denotes a USB terminal for connecting a digital camera. Further, a USB connector 1013 for connecting a personal computer (PC) is provided on the rear face of the printing apparatus.

Reference numeral 3009 is a power source connector, which inputs direct current into which commercial alternating current is converted by a power source 3011. Reference 3010 denotes a general personal computer (PC); 3013, the memory card (PC card) described previously; and 3012, a digital still camera.

Furthermore, the exchanging of signals between the control unit 3000 and the printer engine 3004 is performed via the USB 3021 described previously or an IEEE 1284 bus 3022.

In this embodiment, the control of communication between the printing apparatus and the digital camera is performed using a general file and a general format, which is intended to adapt to the case of second type where NCDP (New Camera Direct Print) independent of the interface is used.

Figure 2:
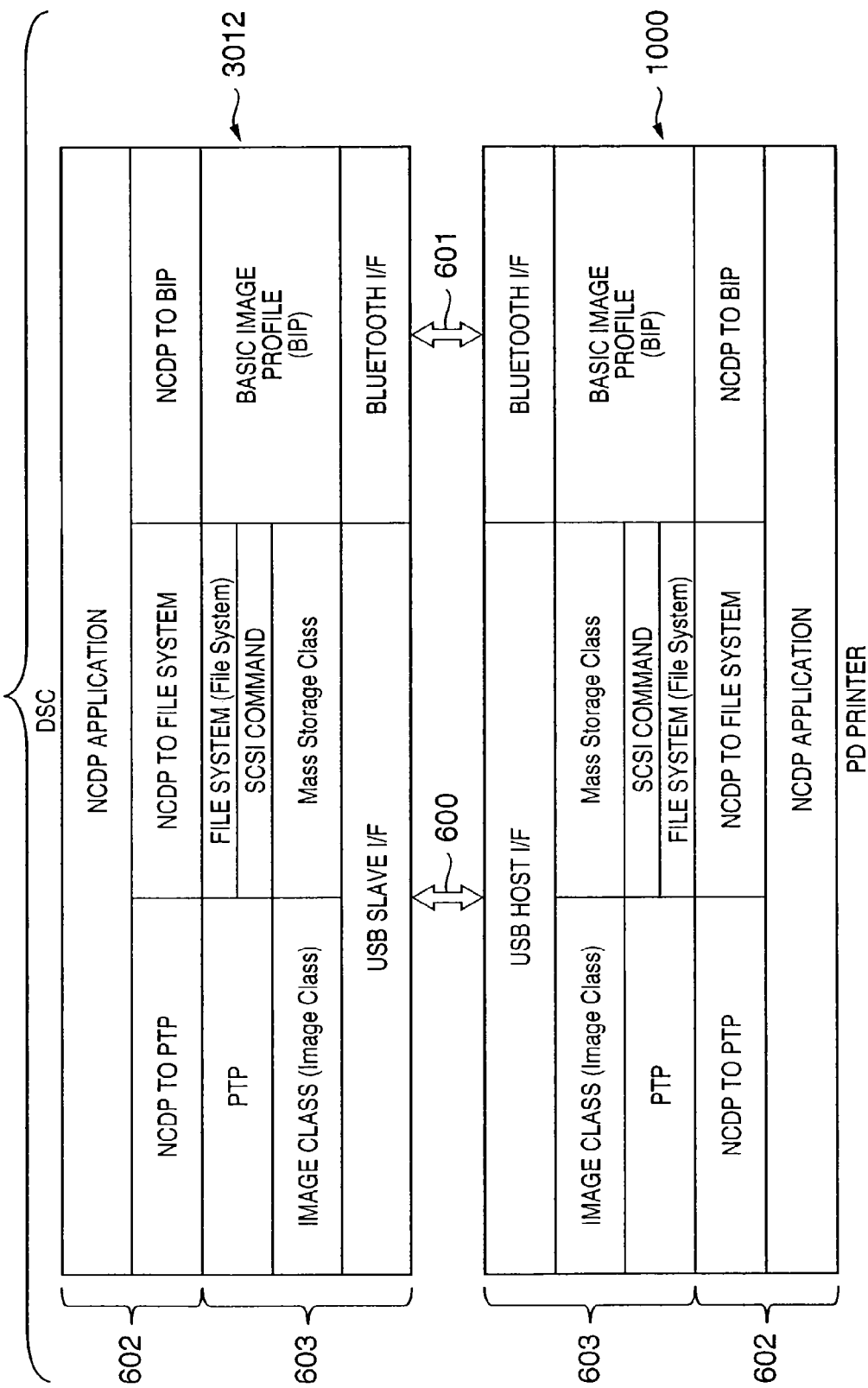
FIG. 2 is an explanatory view showing a software configuration of the image sensing apparatus and a printing apparatus according to the embodiment of the present invention.

FIG. 2 shows one example of a configuration of NCDP.

In this figure, reference numeral 600 denotes an interface compliant with USB, and reference numeral 601 denotes an interface compliant with Bluetooth. Reference numeral 602 denotes an application layer that is incorporated when a system by NCDP is built. Reference numeral 603 denotes a layer for executing existing protocols and interfaces, and in this case, the PTP (Picture Transfer Protocol), the BIP (Basic Image Profile) of SCSI and Bluetooth, the USB interface, and the like are implemented. The NCDP according to the embodiment is designed based on the premise that architectures of these protocol layers and the like are implemented, and the NCDP is implemented thereon as an application. Here, the printing apparatus 1000 is defined as a USB host, and the camera 3012 is defined as a USB slave, and as shown in FIG. 2, they both have a NCDP structure.

Operations in this embodiment will now be described.

First, processing is started at step S1, and communication is automatically started by, for example, wired connection between the digital still camera 3012 as an image sensing apparatus and the printing apparatus 1000 (step S2). Then, at step S3, whether the NCDP has been implemented in both the camera and printing apparatus is determined, and if it has been implemented (i.e., NO in step S2), processing proceeds to the NCDP, whereas if it has not been implemented in one of the camera and the printing apparatus, processing by MSC (Mass Storage Class) is performed.

That is, in the MSC mode, the memory in the camera can be accessed from the printing apparatus, but the controller of the camera cannot be accessed from the printing apparatus. For example, some of the conventional printing apparatus of conventional type do not implement the above described NCDP. Therefore, if this MSC type printing apparatus is connected to the NCDP type camera, it may be impossible to perform printing, or miss printing may occur. But in the embodiment of the present invention, whether the second mode allowing processing control (print control) of the external image processing apparatus to be performed from the image sensing apparatus implementing the NCDP is used or not is checked in initial communication in order to prevent the above problem. Also, if the camera and the printing apparatus can not communicate in NCDP, switching is automatically made to print control as MSC (i.e. the procedure in which it is determined that the first mode of directly accessing the memory of the image sensing apparatus from the external image processing apparatus is used, and image data in the image sensing apparatus is drawn, and is thereafter printed), and therefore the above problem does not arise. Also, inconvenience such that an operator makes operational errors, or is confused is eliminated.

Furthermore, in the case of the MSC, the monitor of the camera is switched to the energy-saving mode to turn the monitor of the camera off, or display of "operate the printer" is provided and image display and the. like are dismissed, at step S4.

In association therewith, the monitor on the printer side is turned on.

Then, whether an image transfer switch provided on the printer side has been turned on or not is checked at step S5.

If it is determined that the image transfer switch has been turned on at step S5, processing proceeds to step S6, where image data in the camera is transferred to the printer, the image data from the camera is collectively transferred to the memory in the printer apparatus. This is because the problem such that the battery of the camera is down can be avoided by collectively transferring image data in the camera.

Then, thumbnail images of a plurality of images transferred to the monitor on the printer side are displayed for search.

Then, at step S7, processing waits until an image to be printed is designated, and also waits until the print switch is pressed. When the print switch is turned on, the operation of printing the designated image is performed at step S8. After the print operation in step S8 is completed, processing returns to step S7.

If it is determined that the NCDP has been implemented in both the camera and printing apparatus at step S3, processing proceeds to step S9, where display of "perform the print operation" is provided on the camera monitor, and the monitor on the printing apparatus side is switched to the energy-saving mode. Processing waits until the transfer switch on the camera side is turned on at step S10, and when the transfer switch is turned on, image data in the camera is transferred to the printer at step S11.

Then, at step S12, an image to be printed is designated on the camera side, and thereafter processing waits until the print switch is pressed on the camera side. When the print switch on the camera side is turned on, an instruction for printing is sent to the printing apparatus in a command or file format, and the operation of printing the designated image is performed in the printing apparatus at step S13. Furthermore, when the print operation in step S13 is completed, processing returns to step S12.

As described above, according to the embodiment, an external image processing apparatus such as the printing apparatus can be connected directly to an image storage apparatus such as the image sensing apparatus by wire or wireless means without the involvement of a PC and controlled to easily perform processing such as the printing of sensed images (other processing includes image editing), thus making it possible to achieve image processing environment of superior usability such as photographing, searching and printing.

Also, even in the case where different types of image storage apparatus and external image processing apparatus are used in combination, control can automatically performed to carry out optimum processing. Thus, operational errors and the like can be prevented to improve operational characteristics significantly.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising an image sensing unit which converts an optical image of an object into an electric image signal, and an interface capable of communicating with an external printing apparatus, wherein the image sensing apparatus comprises:

a communication control unit which starts communication between the image sensing apparatus and the external printing apparatus, with the external printing apparatus being a host and the image sensing apparatus being a slave, to transfer the image signal to the external printing apparatus via the interface;

a detection unit which automatically detects, upon a connection between the image sensing apparatus and the external printing apparatus is being established, whether control relation between the image sensing apparatus and the external printing apparatus is a first type of direct printing in which the external printing apparatus and the image sensing apparatus are connected in Mass Storage Class mode of USB and a memory in the image sensing apparatus can be accessed directly from the external printing apparatus, or a second type of direct printing in which processing in the external printing apparatus can be controlled by a controller of the image sensing apparatus, by communication with the external printing apparatus via the interface;

a display unit; and a processing controller which automatically changes between a processing procedure in which the image sensing apparatus is restricted to transmission of image data stored in a memory of the image sensing apparatus to the external printing apparatus in response to an instruction from the external printing apparatus in a case where the first type of direct printing is detected, and a processing procedure in which the image sensing apparatus transmits image data to be printed and a print command to the external printing apparatus in a case where the second type of direct printing is detected, wherein the processing controller (i) displays a message to operate the external printing apparatus and turns off the display unit in response to the detection of the first type of direct printing, and (ii) displays a message to perform print operation on the display unit in response to the detection of the second type of direct printing.

2. The image sensing apparatus according to claim 1, wherein in a case where the control relation is the second type, the external printing apparatus is controlled based on a predetermined file or command from the image sensing apparatus.

3. The image sensing apparatus according to claim 1, wherein in a case where the control relation is the first type, the processing of the image from the image sensing apparatus can be started based on an operation of a switch provided in the external printing apparatus.

4. The image sensing apparatus according to claim 1, wherein in a case where the control relation is the second type, the external printing apparatus can start the processing of the image from the image sensing apparatus in response to an operation of a switch provided in the image sensing apparatus.

5. The image sensing apparatus according to claim 1, wherein in a case where the control relation is the first type, the external printing apparatus comprises a display unit which displays the image from the image sensing apparatus.

6. The image sensing apparatus according to claim 1, wherein the external printing apparatus is a printing apparatus, which prints the image from the image sensing apparatus.

7. A control method for an image sensing apparatus comprising an image sensing unit which converts an optical image of an object into an electric image signal, an interface capable of communicating with an external printing apparatus, and a display unit, the control method comprising:

starting communication between the image sensing apparatus and the external printing apparatus, with the external printing apparatus being a host and the image sensing apparatus being a slave, to transfer the image signal to the external printing apparatus via the interface;

automatically detecting, upon a connection between the image sensing apparatus and the external printing apparatus is being established, whether control relation between the image sensing apparatus and the external printing apparatus is a first type of direct printing in which the external printing apparatus and the image sensing apparatus are connected in Mass Storage Class mode of USB and a memory in the image sensing apparatus can be accessed directly from the external printing apparatus, or a second type of direct printing in which processing in the external printing apparatus can be controlled by a controller of the image sensing apparatus, by communication with the external printing apparatus via the interface; and automatically changing between a processing procedure in which the image sensing apparatus is restricted to transmission of image data stored in a memory of the image sensing apparatus to the external printing apparatus in response to an instruction from the external printing apparatus in a case where the first type of direct printing is detected, and a processing procedure in which the image sensing apparatus transmits image data to be printed and a print command to the external printing apparatus in a case where the second type of direct printing is detected, wherein the changing step (i) displays a message to operate the external printing apparatus and turns off the display unit in response to the detection of the first type of direct printing, and (ii) displays a message to perform print operation on the display unit in response to the detection of the second type of direct printing.

8. The control method according to claim 7, wherein in a case where the control relation is the second type, the external printing apparatus is controlled based on a predetermined file or command from the image sensing apparatus.

9. The control method according to claim 7, wherein in a case where the control relation is the first type, the processing of the image from the image sensing apparatus can be started in response to an operation of a switch provided in the external printing apparatus.

10. The control method according to claim 7, wherein in a case where the control relation is the second type, the external printing apparatus can start the processing of the image from the image sensing apparatus in response to an operation of a switch provided in the image sensing apparatus.

11. The control method according to claim 7, wherein in a case where the control relation is the first type, the external printing apparatus comprises a display unit which displays the image from the image sensing apparatus.

12. The control method according to claim 7, wherein the external printing apparatus is a printing apparatus, which prints the image from the image sensing apparatus.

13. A computer readable storage medium storing a program for implementing the control method described in claim 7.

14. The image sensing apparatus according to claim 1, wherein the first type is the control relation in which the external printing apparatus is not capable of accessing to the controller of the image sensing apparatus.

15. The control method according to claim 7, wherein the first type is the control relation in which the external printing apparatus is not capable of accessing to the controller of the image sensing apparatus.

* * * * *